(12) United States Patent
Han

(10) Patent No.: US 11,950,120 B2
(45) Date of Patent: Apr. 2, 2024

(54) MDT MEASUREMENT LOG TRANSMISSION METHOD, TERMINAL, AND READABLE STORAGE MEDIUM

(71) Applicant: SPREADTRUM COMMUNICATIONS (SHANGHAI) CO., LTD., Shanghai (CN)

(72) Inventor: Lifeng Han, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 489 days.

(21) Appl. No.: 17/271,880

(22) PCT Filed: Jun. 26, 2019

(86) PCT No.: PCT/CN2019/093014
§ 371 (c)(1),
(2) Date: Feb. 26, 2021

(87) PCT Pub. No.: WO2020/042737
PCT Pub. Date: Mar. 5, 2020

(65) Prior Publication Data
US 2021/0266774 A1    Aug. 26, 2021

(30) Foreign Application Priority Data

Aug. 31, 2018 (CN) .......................... 201811016439.8

(51) Int. Cl.
*H04W 24/10* (2009.01)
(52) U.S. Cl.
CPC .................. *H04W 24/10* (2013.01)
(58) Field of Classification Search
CPC ..... H04W 24/10; H04W 24/02; H04W 24/08; H04W 88/02; H04L 43/06; H04L 41/069
(Continued)

(56) References Cited

U.S. PATENT DOCUMENTS

2011/0306345 A1* 12/2011 Wu ........................ H04W 24/08
                                                                    455/466
2011/0312306 A1    12/2011 Wu
(Continued)

FOREIGN PATENT DOCUMENTS

CN        102378236 A        3/2012
CN        102752787 A        10/2012
(Continued)

OTHER PUBLICATIONS

3rd Generation Partnership Project; Technical Specification Group Radio Access Network; Evolved Universal Terrestrial Radio Access (E-UTRA) and NR; Multi-connectity; Stage 2 Release 15; 3GPP TS 37.340 V15.2.0, Jun. 2018, 55 pages.
(Continued)

*Primary Examiner* — Kwang B Yao
*Assistant Examiner* — Syed M Bokhari
(74) *Attorney, Agent, or Firm* — CANTOR COLBURN LLP

(57) ABSTRACT

A MDT measurement log transmission method, a terminal, and a readable storage medium. The MDT measurement log transmission method comprises: transmitting an available indication to a network side via a first signaling bearer, the available indication being used to indicate to the network side that log-type MDT measurement log information has been stored; receiving a reporting indication message transmitted by the network side via a second signaling bearer, the reporting indication message being used to indicate that the log-type MDT measurement log information has been reported; and determining a third signaling bearer, and transmitting the log-type MDT measurement log information to the network side on the basis of third signaling. The solution reports a MDT measurement log via a MN link or
(Continued)

a SN link, thereby reporting a MDT measurement result in a timely manner.

15 Claims, 1 Drawing Sheet

(58) Field of Classification Search
USPC .......................................................... 370/252
See application file for complete search history.

(56) References Cited

U.S. PATENT DOCUMENTS

| | | | |
|---|---|---|---|
| 2012/0083263 A1* | 4/2012 | Kim | H04W 72/542 |
| | | | 455/423 |
| 2013/0072182 A1 | 3/2013 | Jung et al. | |
| 2013/0142143 A1 | 6/2013 | Yan et al. | |
| 2013/0189990 A1* | 7/2013 | Kim | H04B 17/27 |
| | | | 455/517 |
| 2014/0051428 A1 | 2/2014 | Jung et al. | |
| 2014/0066107 A1* | 3/2014 | Schmidt | H04W 68/00 |
| | | | 455/458 |
| 2015/0031308 A1* | 1/2015 | Schmidt | H04W 72/21 |
| | | | 455/67.11 |
| 2015/0044973 A1 | 2/2015 | Siomina | |
| 2017/0272968 A1 | 9/2017 | Kim et al. | |
| 2017/0331670 A1* | 11/2017 | Parkvall | H04W 24/10 |

FOREIGN PATENT DOCUMENTS

| | | | | |
|---|---|---|---|---|
| CN | 102948202 A | | 2/2013 | |
| CN | 103229540 A | | 7/2013 | |
| CN | 106304342 A | | 1/2017 | |
| EP | 2398271 A1 | * | 12/2011 | ............ H04W 24/10 |
| EP | 2398271 A1 | | 12/2011 | |
| KR | 20110139146 A | | 12/2011 | |
| KR | 20120035028 A | | 4/2012 | |
| KR | 20140010149 A | | 1/2014 | |
| KR | 20150055535 A | | 5/2015 | |
| WO | WO-2011160274 A1 | * | 12/2011 | ............ G06F 17/00 |
| WO | 2013133749 A1 | | 9/2013 | |
| WO | 2015174782 A1 | | 11/2015 | |
| WO | 2018004509 A1 | | 1/2018 | |
| WO | 2018057076 A1 | | 3/2018 | |
| WO | WO-2018057076 A1 | * | 3/2018 | |
| WO | 2018128572 A1 | | 7/2018 | |

OTHER PUBLICATIONS

Korean IPO 2nd Office Action for corresponding KR Application No. 10-2021-7009205; Mailing Date, Mar. 29, 2023.
EPO Extended European Search Report for corresponding EP Application No. 19853374.7, dated Oct. 18, 2021.
KR IPO First Office Action for corresponding KR Application No. 10-2021-7009205, dated Sep. 21, 2022.
International Search Report for International Application No. PCT/CN2019/093014, dated Sep. 9, 2019.

* cited by examiner

MDT MEASUREMENT LOG TRANSMISSION METHOD, TERMINAL, AND READABLE STORAGE MEDIUM

CROSS-REFERENCE TO RELATED APPLICATIONS

This is the U.S. national stage of application No. PCT/CN2019/09014 filed on Jun. 26, 2019. Priority under 35 U.S.C. § 119(a) and 35 U.S.C. § 365(b) is claimed from Chinese Application No. 201811016439.8, filed Aug. 31, 2018, the disclosure of which is also incorporated herein by reference.

TECHNICAL FIELD

The present disclosure generally relates to communication field, and more particularly, to a Minimization Drive Test (MDT) measurement log transmission method, a terminal and a readable storage medium.

BACKGROUND

In mobile communication systems, for manual participation of network planning and operation and maintenance, a network self-optimization mechanism has been introduced. A network automatically optimizes parameters based on statistics, thereby reducing cost of network construction and operation.

In the network self-optimization mechanism, to reduce cost of network operation and maintenance, the network may configure for a User Equipment (UE) to report measurement results, thereby reducing manual drive test works. For example, an MDT technology has been introduced in a Long Term Evolution (LTE) system. MDT measurement is classified into two types including Immediate MDT and Logged MDT. For Immediate MDT, the UE performs MDT measurement and report in a connected state in a manner of multiplexing Radio Resource Management (RRM). Once a report condition is met, the UE immediately reports to an evolved Node B (eNB) or a Radio Network Controller (RNC) a measurement result. For Logged MDT, the UE saves an MDT measurement result in an idle state or an inactive state, and then reports the MDT measurement result in a subsequent connected state.

To increase network capacity, a Dual Connectivity mechanism has been introduced in radio networks. In a dual link, a base station that has an interface with a Core Network (CN) and is regarded as a mobile anchor point by the CN is called a Master Node (MN). A node that provides additional radio resources for the UE is called a Secondary Node (SN). The MN or SN may be either an eNB or a gNB, corresponding to different network architectures. When then MN and SN correspond to base stations of different systems, a corresponding network architecture is collectively called Multi-RAT Dual Connectivity (MR-DC).

In existing techniques, the UE cannot report log information of logged MDT measurement through an SN link, which may cause the network side to fail to obtain an MDT measurement result in time, and further affect service performance.

SUMMARY

By embodiments of the present disclosure, an MDT measurement log may be reported in time.

In an embodiment of the present disclosure, an MDT measurement log transmission method is provided, including: transmitting an availability indication to a network side through a first signaling bearer, wherein the availability indication is used to indicate to the network side that log information of logged MDT measurement has been stored; receiving a report indication message from the network side through a second signaling bearer, wherein the report indication message is used to indicate to report the log information of logged MDT measurement; and determining a third signaling bearer, and transmitting the log information of logged MDT measurement to the network side through the third signaling bearer.

Optionally, determining the third signaling bearer includes: determining the third signaling bearer based on the second signaling bearer.

Optionally, determining the third signaling bearer based on the second signaling bearer includes: the third signaling bearer being the same as the second signaling bearer.

Optionally, determining the third signaling bearer includes: receiving Radio Resource Control (RRC) signaling from the network side, wherein the RRC signaling includes related information of the third signaling bearer, and determining the third signaling bearer based on the RRC signaling.

Optionally, the related information of the third signaling bearer includes at least one Radio Access Technology (RAT) type and at least one corresponding signaling bearer.

Optionally, the related information of the third signaling bearer includes a data size threshold.

Optionally, determining the third signaling bearer based on the RRC signaling includes: when a data size corresponding to the log information of logged MDT measurement exceeds the data size threshold, determining the third signaling bearer based on an RAT type corresponding to the log information of logged MDT measurement and a preset criterion, wherein the preset criterion includes at least one RAT type and at least one corresponding signaling bearer.

Optionally, determining the third signaling bearer includes: determining the third signaling bearer based on an RAT type corresponding to the log information of logged MDT measurement and a preset criterion, wherein the preset criterion includes at least one RAT type and at least one corresponding signaling bearer.

Optionally, the availability indication further indicates an RAT type corresponding to the log information of logged MDT measurement.

Optionally, the RAT type includes at least one of 2G, 3G, 4G, 5G or 6G.

Optionally, the first signaling bearer, the second signaling bearer or the third signaling bearer includes any one of Signaling Radio Bearer (SRB) or split SRB.

Optionally, the SRB includes any one of SRB1, SRB2 or SRB3.

Optionally, the split SRB includes any one of split SRB1 or split SRB2.

In an embodiment of the present disclosure, a terminal is provided, including: a first transmitting circuitry configured to transmit an availability indication to a network side through a first signaling bearer, wherein the availability indication is used to indicate to the network side that log information of logged MDT measurement has been stored; a receiving circuitry configured to receive a report indication message from the network side through a second signaling bearer, wherein the report indication message is used to indicate to report the log information of logged MDT measurement; and a second transmitting circuitry configured to determine a third signaling bearer, and transmit the log information of logged MDT measurement to the network side through the third signaling bearer.

Optionally, the second transmitting circuitry is configured to determine the third signaling bearer based on the second signaling bearer.

Optionally, the third signaling bearer is the same as the second signaling bearer.

Optionally, the second transmitting circuitry is configured to: receive RRC signaling from the network side, wherein the RRC signaling includes related information of the third signaling bearer, and determine the third signaling bearer based on the RRC signaling.

Optionally, the related information of the third signaling bearer includes at least one RAT type and at least one corresponding signaling bearer.

Optionally, the related information of the third signaling bearer includes a data size threshold.

Optionally, the second transmitting circuitry is configured to: when a data size corresponding to the log information of logged MDT measurement exceeds the data size threshold, determine the third signaling bearer based on an RAT type corresponding to the log information of logged MDT measurement and a preset criterion, wherein the preset criterion includes at least one RAT type and at least one corresponding signaling bearer.

Optionally, the second transmitting circuitry is configured to: determine the third signaling bearer based on an RAT type corresponding to the log information of logged MDT measurement and a preset criterion, wherein the preset criterion includes at least one RAT type and at least one corresponding signaling bearer.

Optionally, the availability indication further indicates an RAT type corresponding to the log information of logged MDT measurement.

Optionally, the RAT type includes at least one of 2G, 3G, 4G, 5G or 6G.

Optionally, the first signaling bearer, the second signaling bearer or the third signaling bearer includes any one of SRB or split SRB.

Optionally, the SRB includes any one of SRB1, SRB2 or SRB3.

Optionally, the split SRB includes any one of split SRB1 or split SRB2.

In an embodiment of the present disclosure, a nonvolatile or nontransitory computer readable storage medium having computer instructions stored therein is provided, wherein when the computer instructions are executed, any one of the above methods is performed.

In an embodiment of the present disclosure, a terminal including a memory and a processor is provided, wherein the memory has computer instructions stored therein, and when the processor executes the computer instructions, any one of the above methods is performed.

Embodiments of the present disclosure may provide following advantages.

In embodiments of the present disclosure, an availability indication is transmitted to a network side through a first signaling bearer, a report indication message is received from the network side through a second signaling bearer, and log information of logged MDT measurement is transmitted to the network side through a third signaling bearer, where MDT measurement log may be reported via an MN link or an SN link. In this way, an MDT measurement result may be reported in time.

Further, the network side uses RRC signaling to indicate related information of the third signaling bearer, thereby flexibly indicating a report path of the MDT measurement log based on information such as network load status, which may reduce influence on user services and improve performance of an overall communication network.

DETAILED DESCRIPTION

In existing techniques, the UE cannot report log information of logged MDT measurement through an SN link, which may cause the network side to fail to obtain an MDT measurement result in time, and further affect service performance.

In embodiments of the present disclosure, an availability indication is transmitted to a network side through a first signaling bearer, a report indication message is received from the network side through a second signaling bearer, and log information of logged MDT measurement is transmitted to the network side through a third signaling bearer, where MDT measurement log may be reported via an MN link or an SN link. In this way, an MDT measurement result may be reported in time.

In order to clarify the objects, characteristics and advantages of the disclosure, embodiments of present disclosure will be described in detail in conjunction with accompanying drawings.

Figure 1:
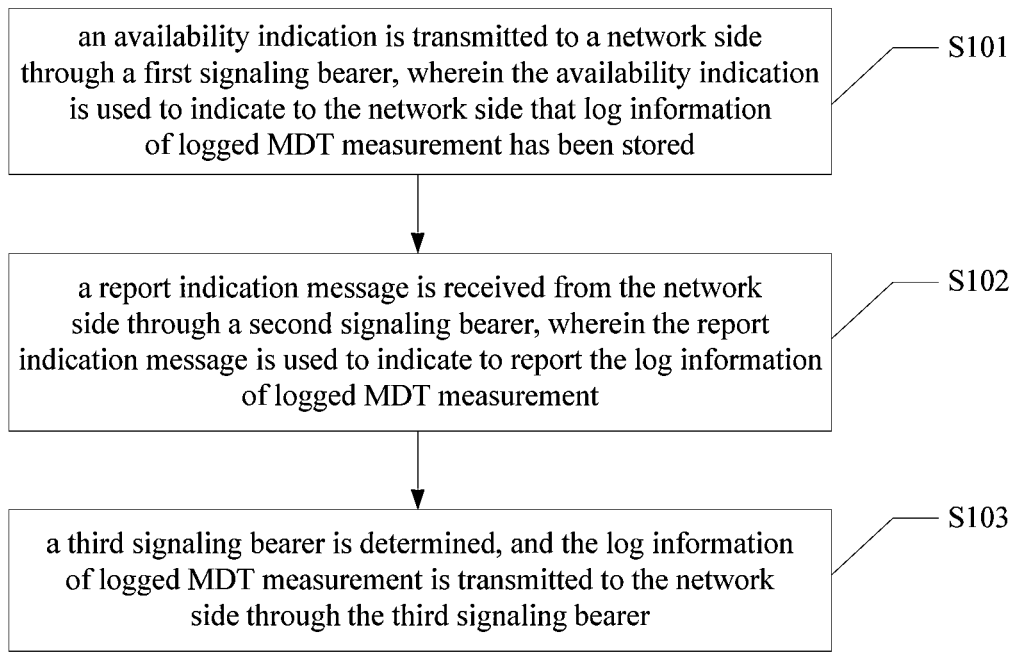
FIG. 1 is a flow chart of an MDT measurement log transmission method according to an embodiment.

FIG. 1 is a flow chart of an MDT measurement log transmission method according to an embodiment. Referring to FIG. 1, the method may include S101, S102 and S103.

In S101, an availability indication is transmitted to a network side through a first signaling bearer, wherein the availability indication is used to indicate to the network side that log information of logged MDT measurement has been stored.

In the existing techniques, for an MR-DC scenario, that is, an MN and an SN are base stations of different communication systems, log information of logged MDT measurement cannot be reported through an SN link, which may cause a network side to fail to obtain an MDT measurement result in time and further affect service performance. Therefore, in embodiments of the present disclosure, it is considered to report an availability indication to the network side, receive a report indication message from the network side, and report log information of logged MDT measurement.

In some embodiments, for an NR-DC scenario, an SRB is established between the UE and the MN, and a split SRB is established between the UE and the SN. As the log information of logged MDT measurement cannot be reported through an SN link in the existing techniques, the network side may not be able to obtain the MDT measurement result in time, which affects service performance. Therefore, in the embodiments of the present disclosure, it is considered to report an availability indication to the network side, receive a report indication message from the network side, and report log information of logged MDT measurement.

In some embodiments, the first signaling bearer may include SRB, or may include Split SRB.

In some embodiments, when the first signaling bearer includes SRB, the first signaling bearer may include any one of SRB1, SRB2 or SRB3.

In some embodiments, when the first signaling bearer includes Split SRB, the first signaling bearer may include Split SRB1 or Split SRB2.

In some embodiments, the UE may transmit uplink RRC signaling through the first signaling bearer to carry the availability indication, for example, through an SN RRC Reconfiguration Complete message, an SN RRC Measurement Report message, an RRC Connection Reconfiguration Complete message, an RRC Connection Reestablishment Complete message, an RRC Connection Resume Complete message, an RRC Connection Setup Complete message or a UE Information Response message, which is not limited in the embodiments of the present disclosure.

In some embodiments, the first signaling bearer may correspond to MN or SN, that is, the first signaling bearer may belong to a link of MN or a link of SN.

In some embodiments, when the UE transmits the availability indication to the network side through the first signaling bearer, an RAT type corresponding to the log information of logged MDT measurement, i.e., the RAT type to which the log information of logged MDT measurement belongs, may be also carried. After receiving the availability indication, the network side learns log information of logged MDT measurement corresponding to which RAT types that can be reported has been stored in the UE. For example, the RAT type corresponding to the log information of logged MDT measurement includes LTE and 5G, and the network side learns that the UE stores Logged MDT measurement of LTE and 5G systems that can be reported.

In some embodiments, the RAT type may be any one or more of 2G, 30, 4G, 5G and 6G.

In some embodiments, the 2G may be a Global System for Mobile Communication (GSM) system, the 3G may be a Universal Mobile Telecommunications System (UMTS) or a Code Division Multiple Access (CDMA) system.) System, and the 4G may be an LTE system.

In S102, a report indication message is received from the network side through a second signaling bearer, wherein the report indication message is used to indicate to report the log information of logged MDT measurement.

In some embodiments, the second signaling bearer may include SRB or Split SRB.

In some embodiments, when the second signaling bearer includes SRB, the second signaling bearer may include any one of SRB1, SRB2 or SRB3.

In some embodiments, when the second signaling bearer includes Split SRB, the second signaling bearer may include Split SRB1 or Split SRB2.

In some embodiments, the second signaling bearer may correspond to MN or SN, that is, the second signaling bearer may belong to a link of MN or a link of SN.

In some embodiments, the UE may transmit uplink RRC signaling through the first signaling bearer to carry the availability indication, for example, through an SN RRC Reconfiguration Complete message, an SN Measurement Report message, an RRC Connection Reconfiguration Complete message, an RRC Connection Reestablishment Complete message, an RRC Connection Resume Complete message, an RRC Connection Setup Complete message or a UE Information Response message, which is not limited in the embodiments of the present disclosure.

In some embodiments, the network side may transmit downlink RRC signaling through the second signaling bearer to carry the report indication message. For example, after receiving the availability indication reported by the UE and deciding to request the UE to report the stored Logged MDT measurement, the network side transmits an RRC message to the UE to request the UE to report the stored Logged MDT measurement.

In some embodiments, the network side may transmit the report indication message through a UE Information Request message. After receiving the UE Information Request message, the UE reports the Logged MDT measurement to the network side through a UE Information Response message.

In S103, a third signaling bearer is determined, and the log information of logged MDT measurement is transmitted to the network side through the third signaling bearer.

In some embodiments, the third signaling bearer may include SRB or Split SRB.

In some embodiments, when the third signaling bearer includes SRB, the third signaling bearer may include any one of SRB1, SRB2 or SRB3.

In some embodiments, when the third signaling bearer includes Split SRB, the third signaling bearer may include Split SRB1 or Split SRB2.

In some embodiments, the third signaling bearer may correspond to MN or SN, that is, the third signaling bearer may belong to a link of MN or a link of SN.

In some embodiments, there are three methods for determining the third signaling bearer. The first is determining the third signaling bearer based on the second signaling bearer. For example, if the second signaling bearer is SRB2, the third signaling bearer is also SRB2. The second is determining the third signaling bearer based on the RRC signaling transmitted by the network side. The third is determining the third signaling bearer based on the RAT type corresponding to the log information of logged MDT measurement and a preset criterion.

In some embodiments, determining the third signaling bearer includes: determining the third signaling bearer based on the second signaling bearer.

In some embodiments, determining the third signaling bearer based on the second signaling bearer includes: the third signaling bearer being the same as the second signaling bearer.

In some embodiments, SRB used in a UE Information Request message transmitted by the network side may be used to indicate a path for the UE to report the Logged MDT measurement. For example, if the network side issues a UE Information Request message through SRB3, the UE uses SRB3 to report the Logged MDT measurement. If the network side issues a UE Information Request message through SRB2, the UE uses SRB2 to report the Logged MDT measurement. If the network side issues a UE Information Request message through SplitSRB1, the UE uses SplitSRB1 to report the Logged MDT measurement. If the network side issues a UE Information Request message through SplitSRB2, the UE uses SplitSRB2 to report the Logged MDT measurement.

In some embodiments, determining the third signaling bearer includes: receiving RRC signaling from the network side, where the RRC signaling includes related information of the third signaling bearer; and determining the third signaling bearer based on the RRC signaling. For example, if the network side configures the UE to report the logged MDT measurement of RAT type of SN via SRB3 through RRC signaling, the UE may report the logged MDT measurement of the RAT type of SN RAT via SRB3.

For example, if the network side configures the UE to report the logged MDT measurement of RAT type of MN via SRB2 through RRC signaling, the UE may report the logged MDT measurement of the RAT type of MN via SRB2.

In some embodiments, for the NR-DC scenario (i.e., a scenario of the same RAT type for MN and SN), the related information of the third signaling barrier may not include RAT type related information; for the MR-DC scenario (i.e., a scenario of the RAT type of MN being different from the RAT type of SN), the related information of the third signaling barrier may include RAT type related information.

In some embodiments, the related information of the third signaling bearer may include at least one RAT type and at least one corresponding signaling bearer, or may include a data size threshold.

In some embodiments, determining the third signaling bearer based on the RRC signaling includes: when a data size corresponding to the log information of logged MDT measurement exceeds the data size threshold, determining the third signaling bearer based on an RAT type corresponding to the log information of logged MDT measurement and a preset criterion, wherein the preset criterion includes at least one RAT type and at least one corresponding signaling bearer.

For example, the network side configures for the UE the data size threshold. If a data size of the Logged MDT measurement stored in the UE is greater than or equal to the data size threshold, the UE selects a path of MN and SN (i.e., a signaling barrier corresponding to MN and SN) to report based on a preset criterion.

If the data size of the Logged MDT measurement stored in the UE is less than the data size threshold, the UE selects a path (i.e., a signaling bearer) to report the Logged MDT measurement by itself.

For another example, the network side configures for the UE a data size threshold. If a data size of the Logged MDT measurement stored in the UE is greater than or equal to the data size threshold, the UE selects a path of MN (i.e., a signal barrier corresponding to the MN) to report based on a preset criterion. If the data size of the Logged MDT measurement stored in the UE is less than the data size threshold, the UE selects a path of SN (i.e., a signaling bearer corresponding to the SN) to report the Logged MDT measurement.

For another example, the network side configures for the UE a data size threshold. If a data size of the Logged MDT measurement stored in the UE is greater than or equal to the data size threshold, the UE selects a path of SN (i.e., a signal barrier corresponding to the SN) to report based on a preset criterion. If the data size of the Logged MDT measurement stored in the UE is less than the data size threshold, the UE selects a path of MN (i.e., a signaling bearer corresponding to the MN) to report the Logged MDT measurement.

The network side uses RRC signaling to indicate the related information of the third signaling bearer, thereby flexibly indicating a report path of the MDT measurement log based on information such as network load status, which may reduce influence on user services and improve performance of an overall communication network.

In some embodiments, determining the third signaling bearer includes: determining the third signaling bearer based on an RAT type corresponding to the log information of logged MDT measurement and a preset criterion, wherein the preset criterion includes at least one RAT type and at least one corresponding signaling bearer.

For example, the preset criterion (that is, a criterion agreed in advance by the network side and the UE) includes: reporting the logged MDT measurement of the RAT type of the SN via SRB3, and reporting the logged MDT measurement of the RAT type of the MN via SRB2. If Logged MDT measurement of LTE is stored, the UE may report the Logged MDT measurement through an LTE base station from MN and SN in the MR-DC. If Logged MDT measurement of 5G is stored, the UE may report the Logged MDT measurement through a 50 base station from MN and SN in the MR-DC.

In some embodiments, the network side may configure SRB for the UE, or configure Split SRB for the UE, or configure both SRB and Split SRB for the UE, either of which may use the above MDT measurement log transmission method.

By the above embodiments, an availability indication is transmitted to a network side through a first signaling bearer, a report indication message is received from the network side through a second signaling bearer, and log information of logged MDT measurement is transmitted to the network side through a third signaling bearer, where MDT measurement log may be reported via an MN link or an SN link. In this way, an MDT measurement result may be reported in time.

Figure 2:
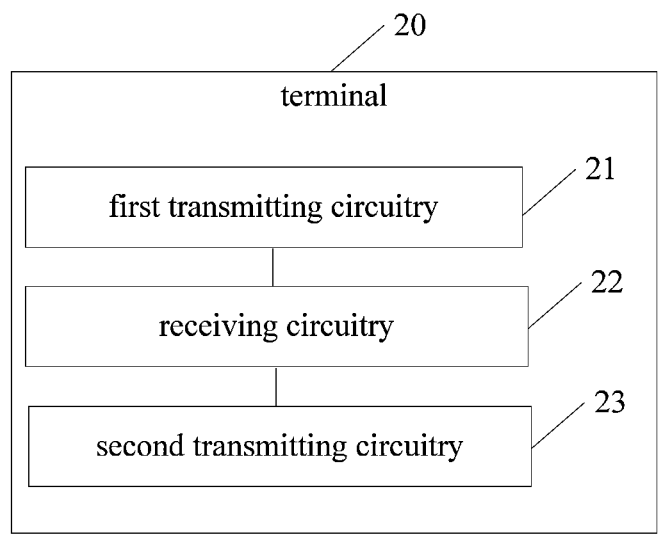
FIG. 2 is a structural diagram of a terminal according to an embodiment.

To enable those skilled in the art to better understand and implement the present disclosure, an embodiment of the present disclosure further provides a terminal capable of performing the above MDT measurement log transmission method, as shown in FIG. 2.

Referring to FIG. 2, the terminal 20 may include a first transmitting circuitry 21, a receiving circuitry 22 and a second transmitting circuitry 23.

The first transmitting circuitry 21 is configured to transmit an availability indication to a network side through a first signaling bearer, wherein the availability indication is used to indicate to the network side that log information of logged MDT measurement has been stored.

The receiving circuitry 22 is configured to receive a report indication message from the network side through a second signaling bearer, wherein the report indication message is used to indicate to report the log information of logged MDT measurement.

The second transmitting circuitry 23 is configured to determine a third signaling bearer, and transmit the log information of logged MDT measurement to the network side through the third signaling bearer.

In some embodiments, the second transmitting circuitry 23 is configured to determine the third signaling bearer based on the second signaling bearer.

In some embodiments, the third signaling bearer is the same as the second signaling bearer.

In some embodiments, the second transmitting circuitry 23 is configured to: receive RRC signaling from the network side, wherein the RRC signaling includes related information of the third signaling bearer; and determine the third signaling bearer based on the RRC signaling.

In some embodiments, the related information of the third signaling bearer includes at least one RAT type and at least one corresponding signaling bearer.

In some embodiments, the related information of the third signaling bearer includes a data size threshold.

In some embodiments, the second transmitting circuitry 23 is configured to: when a data size corresponding to the log information of logged MDT measurement exceeds the data size threshold, determine the third signaling bearer based on an RAT type corresponding to the log information of logged MDT measurement and a preset criterion, wherein the preset criterion includes at least one RAT type and at least one corresponding signaling bearer.

In some embodiments, the second transmitting circuitry 23 is configured to: determine the third signaling bearer based on an RAT type corresponding to the log information of logged MDT measurement and a preset criterion, wherein the preset criterion includes at least one RAT type and at least one corresponding signaling bearer.

In some embodiments, the availability indication further indicates an RAT type corresponding to the log information of logged MDT measurement.

In some embodiments, the RAT type includes at least one of 2G, 3G, 40, 50 or 60.

In some embodiments, the first signaling bearer, the second signaling bearer or the third signaling bearer includes any one of SRB or split SRB.

In some embodiments, the SRB includes any one of SRB1, SRB2 or SRB3.

In some embodiments, the split SRB includes any one of split SRB1 or split SRB2.

More details of working procedures and principles of the terminal 20 can be found in the above descriptions of the method, and are not described in detail here.

In an embodiment of the present disclosure, a nonvalatile or nontransitory computer readable storage medium having computer instructions stored therein is provided, wherein when the computer instructions are executed, any one of the above methods is performed.

In an embodiment of the present disclosure, a terminal including a memory and a processor is provided, wherein the memory has computer instructions stored therein, and when the processor executes the computer instructions, any one of the above methods is performed.

Those skilled in the art could understand that all or parts of the steps in the various methods of the above-mentioned embodiments may be completed by a program instructing relevant hardware, and the program may be stored in any computer-readable storage medium. The storage medium may include a Read Only Memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Minimization Drive Test (MDT) measurement log transmission method, comprising:
   transmitting an availability indication to a network side through a first signaling bearer, wherein the availability indication is used to indicate to the network side that log information of logged MDT measurement has been stored;
   receiving a report indication message from the network side through a second signaling bearer, wherein the report indication message is used to indicate to report the log information of logged MDT measurement; and
   determining a third signaling bearer based on a Radio Access Technology (RAT) type corresponding to the log information of logged MDT measurement and a preset criterion, and transmitting the log information of logged MDT measurement to the network side through the third signaling bearer, wherein the preset criterion comprises at least one RAT type and at least one corresponding signaling bearer, and the third signaling bearer comprises a signaling bearer corresponding to a master node, a signaling bearer corresponding to a secondary node, or a signaling bearer corresponding to a master node and a secondary node.

2. The method according to claim 1, wherein determining the third signaling bearer comprises:
   receiving Radio Resource Control (RRC) signaling from the network side, wherein the RRC signaling comprises related information of the third signaling bearer; and
   determining the third signaling bearer based on the RRC signaling.

3. The method according to claim 2, wherein the related information of the third signaling bearer comprises at least one RAT type and at least one corresponding signaling bearer.

4. The method according to claim 2, wherein the related information of the third signaling bearer comprises a data size threshold.

5. The method according to claim 4, wherein determining the third signaling bearer based on the RRC signaling comprises:
   when a data size corresponding to the log information of logged MDT measurement exceeds the data size threshold, determining the third signaling bearer based on a RAT type corresponding to the log information of logged MDT measurement and a preset criterion, wherein the preset criterion comprises at least one RAT type and at least one corresponding signaling bearer.

6. The method according to claim 1, wherein the availability indication further indicates a RAT type corresponding to the log information of logged MDT measurement.

7. The method according to claim 1, wherein the first signaling bearer, the second signaling bearer or the third signaling bearer comprises any one of Signaling Radio Bearer (SRB) or split SRB.

8. The method according to claim 7, wherein the SRB comprises any one of SRB1, SRB2 or SRB3.

9. A nonvolatile or nontransitory computer readable storage medium having computer instructions stored therein, wherein when the computer instructions are executed, the method of claim 1 is performed.

10. A terminal, comprising:
    a first transmitting circuitry configured to transmit an availability indication to a network side through a first signaling bearer, wherein the availability indication is used to indicate to the network side that log information of logged Minimization Drive Test (MDT) measurement has been stored;
    a receiving circuitry configured to receive a report indication message from the network side through a second signaling bearer, wherein the report indication message is used to indicate to report the log information of logged MDT measurement; and
    a second transmitting circuitry configured to determine a third signaling bearer based on a Radio Access Technology (RAT) type corresponding to the log information of logged MDT measurement and a preset criterion, and transmit the log information of logged MDT measurement to the network side through the third signaling bearer, wherein the preset criterion comprises at least one RAT type and at least one corresponding signaling bearer, and the third signaling bearer comprises a signaling bearer corresponding to a master node, a signaling bearer corresponding to a secondary node, or a signaling bearer corresponding to a master node and a secondary node.

11. The terminal according to claim 10, wherein the second transmitting circuitry is configured to:
    receive Radio Resource Control (RRC) signaling from the network side, wherein the RRC signaling comprises related information of the third signaling bearer; and
    determine the third signaling bearer based on the RRC signaling.

12. The terminal according to claim 11, wherein the related information of the third signaling bearer comprises at least one RAT type and at least one corresponding signaling bearer.

13. The terminal according to claim 11, wherein the related information of the third signaling bearer comprises a data size threshold.

14. The terminal according to claim 13, wherein the second transmitting circuitry is configured to:
  when a data size corresponding to the log information of logged MDT measurement exceeds the data size threshold, determine the third signaling bearer based on a RAT type corresponding to the log information of logged MDT measurement and a preset criterion, wherein the preset criterion comprises at least one RAT type and at least one corresponding signaling bearer.

15. A terminal comprising a memory and a processor, wherein the memory stores one or more programs, the one or more programs comprising computer instructions, which, when executed by the processor, cause the processor to:
  transmit an availability indication to a network side through a first signaling bearer, wherein the availability indication is used to indicate to the network side that log information of logged MDT measurement has been stored;

receive a report indication message from the network side through a second signaling bearer, wherein the report indication message is used to indicate to report the log information of logged MDT measurement; and determine a third signaling bearer based on a Radio Access Technology (RAT) type corresponding to the log information of logged MDT measurement and a preset criterion, and transmit the log information of logged MDT measurement to the network side through the third signaling bearer, wherein the preset criterion comprises at least one RAT type and at least one corresponding signaling bearer, and the third signaling bearer comprises a signaling bearer corresponding to a master node, a signaling bearer corresponding to a secondary node, or a signaling bearer corresponding to a master node and a secondary node.

\* \* \* \* \*